April 30, 1968     S. ZYSK ET AL     3,380,304

REMOTE STATION FOR OCEANOGRAPHIC DATA SENSING

Filed Nov. 26, 1965     2 Sheets-Sheet 1

INVENTORS.
STEPHEN ZYSK,
TORE E. BORG

BY Paul E. Rochford

ATTORNEY

INVENTORS.
STEPHEN ZYSK,
TORE E. BORG
BY Paul E. Rochford
ATTORNEY

United States Patent Office 3,380,304
Patented Apr. 30, 1968

3,380,304
REMOTE STATION FOR OCEANOGRAPHIC DATA SENSING
Stephen Zysk, Stratford, Conn., and Tore E. Borg, Syracuse, N.Y., assignors to General Electric Company, a corporation of New York
Filed Nov. 26, 1965, Ser. No. 510,005
3 Claims. (Cl. 73—342)

ABSTRACT OF THE DISCLOSURE

A system for sensing the temperature of the ocean at vertically spaced points. A cable having a plurality of pairs of conductors is suspended from a buoy. Each pair of conductors is connected through a thermistor located at a different level. A read out device in the form of a stepping switch and bridge circuit is connected to a radio transmitter. Each conductor pair is connected to its individual compensating network so that signals indicative of the temperature at the various levels are sequentially transmitted.

---

Figure 1:
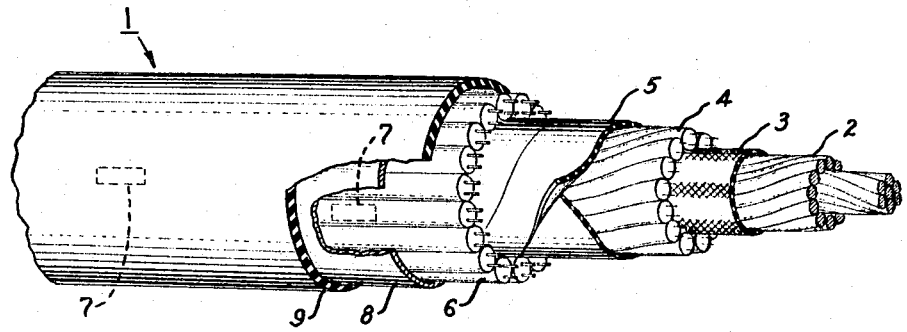

This invention relates generally to a system for sensing ocean water temperature data and more specifically to a system employing a temperature sensing cable and automatic readout means for the cable for sensing ocean water temperature data at remote stations.

Presently we are experiencing a great surge in scientific exploration of the oceans of the world. An aspect of this is that there is an urgent need for accurate and extensive data regarding the temperature of the ocean's waters at various depths and at various locations throughout the world. Sometimes it is also desirable to obtain temperature gradients of ocean waters in ocean currents rather than at a single spot. Obviously it would be very expensive and would require a great deal of time to dispatch ships carrying temperature sensing devices and readout equipment to each and every spot or current in the ocean from which it is desired that data be obtained. Rather it is more desirable to be able to set out unmanned floating buoys or anchored platforms from which temperature data may be obtained and automatically transmitted to a central processing location. Since little or no maintenance of the equipment is possible it is essential that the system be set up so that variations in conditions do not affect the accuracy of the data obtained.

Recently there has been developed a cable having spaced temperature sensing elements such as thermistors embedded therein which can be lowered into the ocean to measure water temperature gradients. Each thermistor is provided with electrical connections which return to one end of the cable connected to a readout device which may be placed aboard a ship or any other surface station. The readout device sees the combined resistance of the electrical connections and the thermistor and, since the resistance of a thermistor varies with the surrounding temperature in a very sensitive manner, very accurate readings of water temperature can be obtained. A temperature sensing cable for use in a device just described which is very easily manufactured and which possesses great strength is fully described and claimed in a copending application Ser. No. 358,899, filed Apr. 10, 1964, to Borg et al., assigned to the assignee of the present invention.

With the development of such a cable as described in the identified copending application it now becomes feasible to produce a system which will accomplish the desiderata mentioned above. Generally, a floating platform would carry a suspended temperature sensing cable and readout equipment which gathers data supplied by the cable and transforms it into radio signals which are picked up at a central processing location. Since there are many and varied types of readout devices available on the market, the system must be such that the cable can be integrated with any existing type of readout device and be interchangeable therewith. Furthermore, since thermistor characteristics vary from one thermistor to another, it is necessary that the system be set up so that the individual characteristics of each thermistor is taken into account. Of extreme importance is the fact that the system must be designed so that it is completely automatic and requires absolutely no maintenance, circuit changes, or adjustments to meet various conditions. Finally the system must be inexpensive.

It is an object of this invention to provide a system whereby accurate temperature data from a thermistor cable may be automatically obtained from an unmanned ocean platform.

It is another object of this invention to provide a method of setting up a system for automatically obtaining temperature data from a thermistor cable on an unmanned ocean platform.

These and further objects of this invention are achieved in one form by the utilization of a temperature sensing thermistor cable and a resistance readout device, the temperature-resistance characteristic of each thermistor being altered to conform to the capabilities of the readout device by means of individual calibrating networks.

Figure 2:
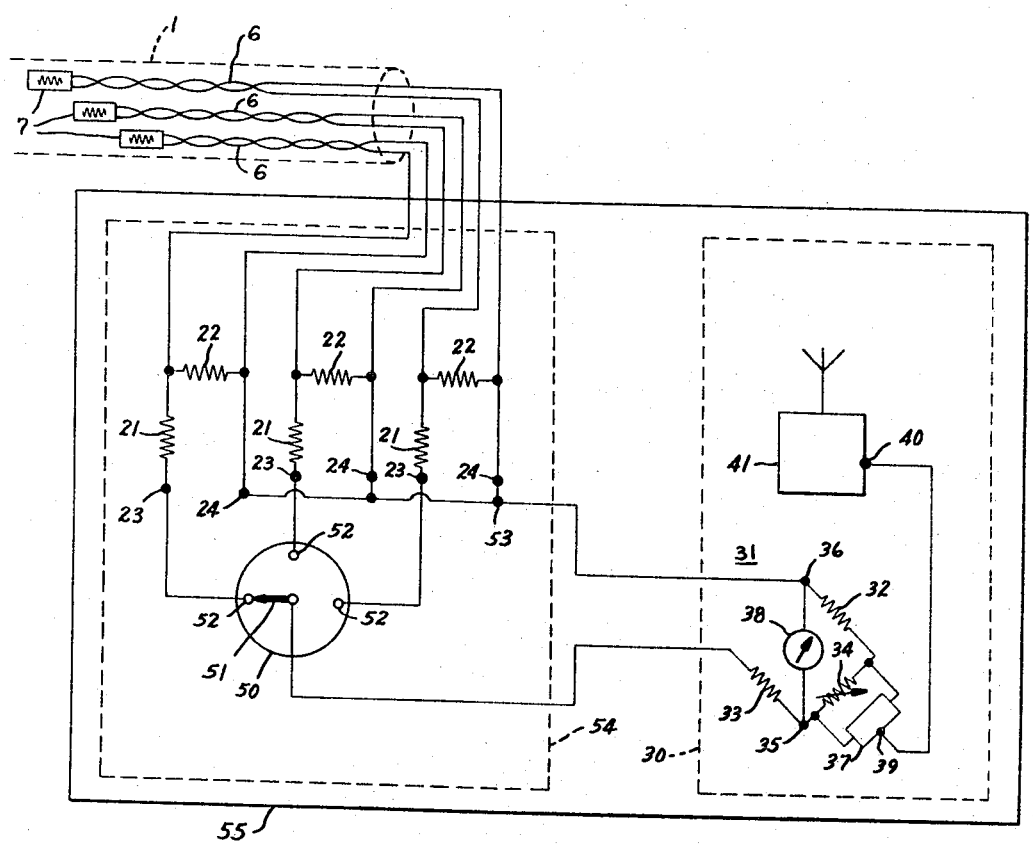
Figure 4:
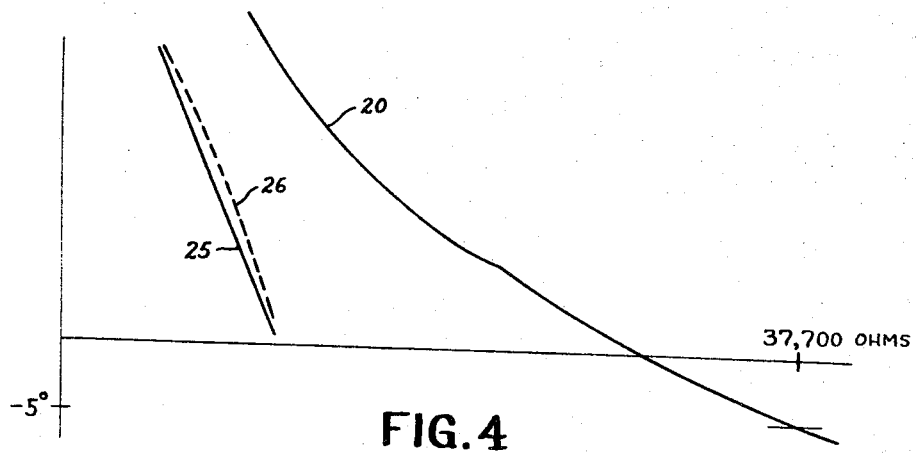
Figure 5:
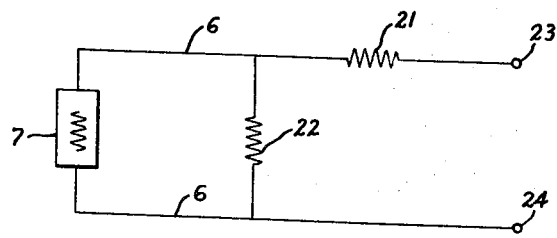
Figure 3:
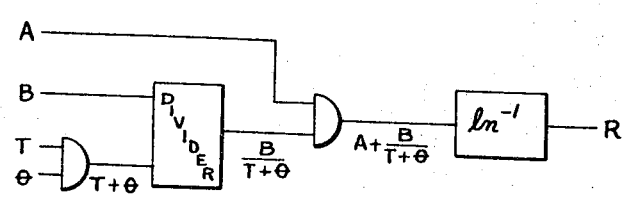

The subject matter regarded as my invention is particularly pointed out and distinctly claimed in the appended claims. The invention, however, both as to its mode of operation, together with further objects and advantages thereof may best be understood with reference to the following description taken in connection with the accompanying drawings in which:

FIG. 1 is a cutaway view of a thermistor cable,
FIG. 2 is a system diagram of the present invention,
FIG. 3 is a block diagram of a computer especially adapted for carrying out the method of the present invention,
FIG. 4 is a graphic representation of resistance-temperature characteristics encountered in the system of the present invention, and
FIG. 5 is a network diagram of one part of the present invention.

Referring to FIG. 1, there is shown a temperature sensing cable 1 including a central strength member 2 comprising a stainless steel rope, around which is wrapped a tar-impregnated jute wrapping 3 which provides thermal insulation between the strength member 2 and the exterior parts of the cable. A number of conductors 4 are placed over the jute wrapping 3 to provide electrical connections to electrical indicating devices at the end of the cable (not shown) which may include perhaps a pressure transducer for accurately determining depths. A separating layer 5 comprising perhaps impregnated paper is placed around the conductors 4. A plurality of conductors 6 comprising twisted pairs of electrical leads are mounted around the layer 5 in a single layer. At spaced intervals along the cable a plurality of temperature sensitive elements 7 such as thermistors are connected to their respective conductors 6, one thermistor per pair of conductor, and the particular spacing between the thermistors depending on the desired measuring points within the temperature gradient. The twisted pair of conductors 6 electrically connect each individual thermistor 7 to a readout device at one end of the cable (not shown). A heat conducting member 8, such as an aluminum tape, is placed over the layer of conductors 6 in the region occupied by each of the temperature sensing elements 7 to provide optimum heat transfer from the water to the elements. A continuous sheath 9 having a substantially uniform outer diameter is placed around the assembly to protect the various elements. This sheath may be advantageously formed from polyethylene to provide a continuous, smooth surface which insures ease of handling while at the same time affording protection from the hostile environment.

Referring now to FIG. 2, depending on the desired depths into the water of the measuring points in the desired temperature gradient, the individual lengths of the twisted pair of wires comprising the conductors 6 are determined. For ease of illustration only three thermistors 7 are shown in the cable 11 in FIG. 2 but it should be appreciated that any number can be used.

In a preferred method of forming the cable 1, if a thermistor 7 is desired to be suspended at a depth of say 50 feet, the twisted pair of leads 6 will be measured out to this length plus an additional calculated length to compensate for the twist of the leads. The thermistor 7 is then attached to the measured pair of leads 6. Since temperature-resistance data for each individual thermistor is desired, and since this data will be affected by the resistance of the pair of leads associated with each thermistor, the data for each thermistor must be taken with the pair of leads attached. In accordance with a formula that will hereinafter be set forth, it is necessary to take measurements for each thermistor and its associated pair of leads at three different temperatures. These temperature measurements can be taken in a controlled temperature facility of any suitable type. Once the three measurements for each individual thermistor are taken, the thermistors and leads are assembled into the cable 1.

Complete sets of temperature-resistance data for each thermistor can then be obtained through the utilization of a computer into which is programmed the following formula:

$$\ln R = A + \frac{B}{T+\theta}$$

where $\ln R$ is natural log of resistance of thermistor and attached leads, R is in ohms. T is temperature in °C. and A, B, and $\theta$ are constants which are to be determined.

While the utilization of this particular formula is essential to the process of setting up the temperature sensing system according to a preferred mode of applicants' invention, it should be understood that the discovery of this particular formula itself is not herein explicitly claimed as a part of this invention and is in fact hereby disclaimed. Rather, the practice of a preferred mode of applicants' invention in one sense depends on the utilization of this formula in the setting up of a novel temperature sensing system which meets present day requirements of oceanography and which have heretofore been unachievable.

Before a detailed example of the practice of a preferred mode of utilization of the above formula is described, it should be understood that in order to achieve desired accuracy in a relatively short time, it is desirable that a computer be employed to solve the given equation for the complete set of data for each thermistor. Therefore, it should be understood that the following detailed example of the solving of the given equation for temperature-resistance data of a particular thermistor will, in a preferred embodiment of applicants' invention, be carried out entirely by a computer although it will also be understood that other methods of solving the equation may be employed.

The basic equation is:

$$\ln R = A + \frac{B}{T+\theta}$$

$\ln R$ = natural log of resistance of thermistor and attached leads, R is ohms.
$T$ = temperature in °C.
A, B, and $\theta$ are constants which are to be determined.

We have three unknowns, A, B and $\theta$.
We set up three equations:

(1) $$\ln R_1 = A + \frac{B}{T_1+\theta}$$

(2) $$\ln R_2 = A + \frac{B}{T_2+\theta}$$

(3) $$\ln R_3 = A + \frac{B}{T_3+\theta}$$

$R_1$ = resistance at $T_1$ °C.
$R_2$ = resistance at $T_2$ °C.
$R_3$ = resistance at $T_3$ °C.

Now solve the three equations simultaneously to get the three constants:
Subtract (2) from (1) to get one equation:

$$\ln R_1 - \ln R_2 = A + \frac{B}{T_1+\theta} - A - \frac{B}{T_2+\theta}$$

(4) $$\ln \frac{R_1}{R_2} = B\left[\frac{T_2-T_1}{(T_1+\theta)(T_2+\theta)}\right]$$

Subtract (3) from (2) to get a second equation:

$$\ln R_2 - \ln R_3 = A + \frac{B}{T_2+\theta} - A - \frac{B}{T_3+\theta}$$

(5) $$\ln \frac{R_2}{R_3} = B\left[\frac{T_3-T_2}{(T_3+\theta)(T_2+\theta)}\right]$$

We can now solve for B and $\theta$ since we have two equations. Substituting the values of B and $\theta$ into (1) we can solve for A.

In a particular example one thermistor was measured in a controlled temperature facility at three different temperatures and yielded the following values:

$R_1$ = 29,360 ohms at $T_1$ = 0° C.
$R_2$ = 18,690 ohms at $T_2$ = 10° C.
$R_3$ = 10,380 ohms at $T_3$ = 25.3° C.

(A) Use (4) $\ln \frac{R_1}{R_2} = B\left[\frac{T_2-T_1}{(T_1+\theta)(T_2+\theta)}\right]$ $$\ln \frac{29360}{18690} = B\left[\frac{10-0}{(0+\theta)(10+\theta)}\right]$$

$$\ln 1573 = B\left[\frac{10}{\theta(10+\theta)}\right]$$

$$.453 = B\left[\frac{10}{\theta(10+\theta)}\right]$$

(B) Use (5) $\ln \frac{R_2}{R_3} = B\left[\frac{T_3-T_2}{(T_3+\theta)(T_2+\theta)}\right]$ $$\ln \frac{18690}{10380} = B\left[\frac{25.3-10}{(25.3+\theta)(10+\theta)}\right]$$

$$\ln 1.8 = B\left[\frac{15.3}{(25.3+\theta)(10+\theta)}\right]$$

$$.558 = B\left[\frac{15.3}{(25.3+\theta)(10+\theta)}\right]$$

Combine (A) and (B)

$$.453 = B\left[\frac{10}{\theta(10+\theta)}\right]$$

$$B = \frac{.453 \times \theta(10+\theta)}{10}$$

$$.588 = B\left[\frac{15.3}{(25.3+\theta)(10+\theta)}\right]$$

$$B = \frac{.588(25.3+\theta)(10+\theta)}{15.3}$$

$.0453\theta(10+\theta) = .0385(25.3+\theta)(10+\theta)$ $.0453\theta = .0385(25.3+\theta)$ $.0453\theta = .974 + .0385\theta$ $$.0068\theta = .974$$

$$\theta = 143.5$$

$$B = .453 \times \frac{143.5(10+143.5)}{10}$$

$$B = \frac{.453 \times 143.5 \times 153.5}{10}$$

$$= 1000$$

(C) Use (1) to solve A:

$$\ln R_1 = A + \frac{B}{T_1 + \theta}$$

$$\ln 29360 = A + \frac{1000}{0 + 143.5}$$

$$10.28 = A + 6.97$$

$$A = 3.31$$

Thus:

$$A = 3.31$$
$$B = 1000$$
$$\theta = 143.5$$

From these values of the constants, the basic equation can be used to obtain a set of data over a wide range of temperatures. When a computer is employed this set of data is accurate to within 0.1° C., which accuracy has been heretofore unobtainable. As an example a value of resistance at −5° C. for the thermistor used above will be obtained:

$$\ln R_{-5} = A + \frac{B}{T_{-5} + \theta}$$

$$= 3.31 + \frac{1000}{-5 + 143.5}$$

$$= 3.31 + \frac{1000}{138.5}$$

$$= 3.31 + 7.22$$

$$= 10.53$$

$$R_{-5} = 38,000 \text{ ohms}$$

Referring to FIG. 3, a block diagram of a computer adapted to solve the above equation for each thermistor is shown.

Referring to FIG. 4, there is shown a graph of temperature versus resistance of the particular thermistor used in the above example with the curve 20 indicating a plot of the temperature-resistance characteristic of this particular thermistor and its attached pair of leads. The data utilized in plotting the curve 20 was taken directly from a computer programmed with the above-identified formula. As can be seen the value of the resistance of the thermistor at −5° C. is approximately 37,700 ohms. This corresponds to the calculated value of 38,000 ohms which was obtained without the utilization of the computer and indicates the errors that can occur without the utilization of the computer.

The curve 20 is logarithmic as would be expected from the basic equation utilized. In addition, the curve covers a wide range of resistance for the range of temperature values expected to be encountered. This, for most practical readout devices, is not acceptable and it is desired to calibrate the curve to linearize it and to bring it within the range of most practical readout devices. This can be done by a calibrating or "padding" network comprising a parallel and series resistor connected to the thermistor and its associated pair of twisted leads. It was discovered that a parallel resistor serves to straighten out the curve 20 and to increase its slope while a series resistor serves to move the curve to a more acceptable resistance range level, usually lower. The particular value of the series and parallel resistors needed can be obtained most easily by a trial and error method; and once a suitable network has been devised for one thermistor, the same network, or other networks with the same value of resistors, can be utilized for every other thermistor in the system.

Reference is made to FIG. 5 wherein a thermistor 7 with a resistance of 37,700 ohms at −5° C. is connected to a calibrating or "padding" network comprising a series resistor 21 and a parallel resistor 22, the other side of which connects to a pair of terminals 23 and 24 which are adapted to be connected to some suitable readout device. Through trial and error it was found that a series resistance of 909 ohms for the resistor 21 and a parallel resistance of 17,400 ohms for the resistor 22 would linearize the response seen by the readout device at the terminals 23 and 24 and would move the whole curve to the left to a more suitable resistance range. Instead of seeing a resistance of 37,700 ohms at −5° C., a readout device will now see an adjusted or calibrated resistance at the terminals 23 and 24 the value of which can be obtained by means of the following calculations:

$$\frac{1}{\text{Parallel resistance}} = \frac{1}{17,400} + \frac{1}{37,700} = .000084$$

Parallel resistance = 11,905 ohms.
Series resistance = 909 ohms.
Total resistance = 11,905 + 909 = 12,814 ohms.
(seen at terminals 23 and 24)

This latter value of resistance is the resistance seen by the readout equipment at terminals 23 and 24. By means of the computer a complete set of temperature-resistance data can be obtained for this particular thermistor connected to its calibrating or "padding" network. A plot of this data is shown in FIG. 4 indicated by the curve 25. The curve 25 is almost linear and the deviation therefrom is shown with reference to an actual linear line 26. The curve 25 is also shifted to a lower range of resistance values from the curve 20.

Referring back to FIG. 2, a calibrating or "padding" network comprising resistors 21 and 22 are provided for each set of thermistors 7 and their respective twisted leads 6. In the actual system these calibrating resistors are not positioned in the cable but rather are placed at the end of the cable above the surface of the water and on the floating platform. In a preferred embodiment all of the calibrating networks are placed on a panel indicated generally by reference numeral 54 and positioned on the floating buoy so that replacement is readily feasible.

The readout equipment for the temperature measuring system is indicated in FIG. 2 generally by the reference numeral 30. This equipment may comprise any suitable resistance measuring device plus some device for transmitting the measurements obtained by means of radio signals. In one embodiment the readout device 30 may comprise a servo balancing Wheatstone bridge 31 comprising a pair of fixed resistors 32 and 33 in opposite legs and an adjustable resistor 34 positioned in a third leg opposite the measuring leg. The particular thermistor and its associated leads and calibrating networks under measurement are placed in the measuring leg of the Wheatstone bridge circuit 31. By means of some automatic servo balancing device 37 the adjustable resistor 34 is varied until the voltage across the corners of the bridge 35 and 36 become balanced so that no current can flow in a current indicating device 38. At balance, the value of the adjustable resistor 34 is proportional to the value of the resistance of the thermistor and its associated "padding" network. An electrical output signal terminal 39 on the servo balancing device 37 is connected to an input terminal 40 of a radio transmitting device 41 which, in turn, transmits the value of the measured resistance by means of an appropriate radio code to a central receiving station. No claim is made herein individually to a particular transmitting system or to a particular code technique used to telemeter the ocean temperature data from the floating buoy to a central receiving station but only to the combination of these individual systems inasmuch as such combination is included as a part of the present invention. At the central receiving station the radio code is converted back into a resistance value which is then compared with the computer calculated data for the particular thermistor under measurement in order to obtain a temperature reading. Conventional substitute means may be included in place thereof as is found amenable to specific communications techniques.

A switching device 50 is shown in FIG. 2 connecting the servo balancing Wheatstone bridge 31 to the various thermistors and their "padding" networks. The switching means 50 may comprise a distributor type device which successively connects a rotating contactor 51 with a plurality of contacts 52, each of which is connected to a respective "padding" network. The rotating contactor 51 is connected to the corner 36 of the Wheatstone bridge 31. The opposite side of the several "padding" networks from the sides connected to their respective contacts 51 in the switching means 50 are all connected to a common point 53. This common point is in turn connected to the side of the fixed resistor 33 in the Wheatstone bridge which is opposite that connected to the corner point 35 of the bridge. Although the particular switching means shown in FIG. 2 does not separately and individually constitute a part of the present invention, it will be noted that in a preferred embodiment of applicants' invention the means which is employed must make successive connections of the various thermistors to the readout device 30. The switching means 50 must be correlated with the readout transmitter 41 so that the particular thermistor under measurement for any given reading is known. In a preferred device the switching means 50 is mounted on the same panel as the various "padding" networks. This panel is indicated generally by the reference terminal 54 and is preferably mounted on the floating buoy in a weather proof container 55 along with the readout device 30.

In the operation of the ocean temperature sensing system in the embodiment described, an activating signal such as a radio signal from a central receiving station turns on the readout device 30 and the switching device 50. The switching device 50 successively connects the various thermistor networks in the cable 1 to the readout device 30 in order to obtain successive temperature readings at various depths in the ocean. In synchronism with the successive switching of the switching device 50, the servo balancing Wheatstone bridge 31 in the readout device 30 becomes balanced by the automatic balancing means 37. The automatic means 37 then transforms the measured resistance of the particular thermistor network under measurement into a code suitable for radio transmission by the transmitter 41. The transmitter 41 telemeters the successive coded data readings to a central receiving station where the code is transformed back into a resistance reading and then into a proportional temperature reading by means of previously derived data. Since all of the equipment with the exception of the cable itself is contained in a weatherproof casing on an unmanned floating platform, and since the entire system can be automatically controlled and operated from the central receiving station, the system is relatively safe from severe weather conditions and is relatively inexpensive to operate. Therefore, by means of such a system, several locations in the ocean may be monitored at any given time with a minimum of manpower and of heavy transporting equipment.

Additionally, since the system is entirely automatic and since the data processing may be done entirely by computer techniques, the system is highly accurate and very rapid. Thus, in accordance with this invention, a high quality and relatively inexpensive ocean temperature data sensing system is provided.

Although the system and its operation of this invention has been described in preferred embodiments, it should be understood that various modifications and other arrangements may be made and used and many of these will be obvious to those skilled in the art once they have the advantage of the teaching of this application. Thus, it is not intended that applicants be limited to the embodiments illustratively described but rather should be entitled to the full scope of the invented claims.

What is claimed as new and desired to be secured by Letters Patent of the United States is:

1. A water temperature sensing system comprising:
   (a) a cable including at least one thermistor element, said cable adapted to be suspended into the water so that said thermistor elements are at desired depths, said thermistor elements exhibiting a resistance which varies approximately logarithmically with surrounding water temperature;
   (b) a pair of leads for each thermistor in said cable;
   (c) a resistance readout device adapted to be positioned above the surface of the water;
   (d) a calibrating network including parallel resistance and series resistance each of fixed values, said parallel resistance altering the resistance-temperature characteristic seen by said readout device from the logarithmic characteristic of said thermistor to an approximately linear characteristic, and said series resistance shifting the resistance range of the linear resistance-temperature characteristic to within the operating range of said readout device, and
   (e) means for electrically connecting said calibrating network to said pairs of leads and to said readout device.

2. The temperature sensing system according to claim 1 wherein the operating range of said readout device is substantially lower than said resistance range of the linear resistance-temperature characteristic.

3. The temperature sensing system as defined in claim 1 wherein said readout device comprises an automatic resistance measuring means which further comprises automatic means for telemetering the measured resistance values to a central receiving station.

References Cited

UNITED STATES PATENTS

| | | | |
|---|---|---|---|
| 2,792,481 | 5/1957 | Wood | 338—36 |
| 2,971,379 | 2/1961 | Weisheit | 73—362 |
| 3,036,464 | 5/1962 | Beeston | 73—342 |
| 3,214,728 | 10/1965 | Higgins | 73—170 UX |

OTHER REFERENCES

Special Publication, Oceanographic Instrumentation, Final Report of the Committee on Instrumentation, 2nd ed., October 1960, U.S. Navy Hydrographic Office, Washington, D.C. (p. III-6 relied upon.)

Instruments and Control Systems, vol. 33, pp. 86–88, January 1960.

LOUIS R. PRINCE, *Primary Examiner.*

S. C. SWISHER, *Assistant Examiner.*